United States Patent
Poulose et al.

(10) Patent No.: US 11,994,232 B1
(45) Date of Patent: May 28, 2024

(54) ELECTRO-MAGNETIC THROTTLE VALVE WITH INTEGRATED BLOWDOWN CONDUIT

(71) Applicant: Ingersoll-Rand Industrial U.S., Inc., Davidson, NC (US)

(72) Inventors: Vineeth Poulose, Bengaluru (IN); Sajesh Poolathody, Malappuram (IN); Nikhil Narayanan, Kozhikode (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 18/130,119

(22) Filed: Apr. 3, 2023

(51) Int. Cl.
*F16K 31/08* (2006.01)
*F04B 49/22* (2006.01)
*F04B 49/24* (2006.01)
*F04C 18/107* (2006.01)
*F04C 28/24* (2006.01)
*F04C 28/26* (2006.01)
*F04C 29/12* (2006.01)
*F16K 27/02* (2006.01)

(52) U.S. Cl.
CPC .......... *F16K 31/086* (2013.01); *F04B 49/225* (2013.01); *F04B 49/243* (2013.01); *F04C 18/107* (2013.01); *F04C 28/24* (2013.01); *F04C 28/26* (2013.01); *F04C 29/124* (2013.01); *F16K 27/029* (2013.01); *F04B 2205/02* (2013.01); *F04B 2205/16* (2013.01)

(58) Field of Classification Search
CPC .... F16K 31/086; F16K 27/029; F04B 49/225; F04B 49/243; F04B 2205/02; F04B 2205/16; F04C 18/107; F04C 28/24; F04C 28/26; F04C 29/124
See application file for complete search history.

(56) References Cited

U.S. PATENT DOCUMENTS

| | | | |
|---|---|---|---|
| 2,856,569 A * | 10/1958 | Birge | F16K 31/0675 335/262 |
| 10,253,682 B2 * | 4/2019 | Lenk | F16K 27/029 |
| 10,550,844 B2 * | 2/2020 | Coeckelbergs | F04C 28/06 |

* cited by examiner

*Primary Examiner* — Mary Davis
(74) *Attorney, Agent, or Firm* — Kevin E. West; Advent, LLP

(57) ABSTRACT

A fluid compressor system having an electro-magnetic throttle valve (EMTV) that utilizes magnetic forces supplied by an electromagnet to actuate the opening and closing of the valve. The fluid compressor system may include a control system that controls the position of a valve plate of the EMTV, allowing the EMTV to fully or partially actuate to a plurality of intermediate positions depending on a current supplied to the electromagnet by the control system. The control system may control a location of the valve plate with reference to the electromagnet by balancing the forces acting on the valve plate, such as electromagnetic forces supplied by the electromagnet, biasing forces supplied by biasing components, and gravitational forces acting on the valve plate. The EMTV may include a blowdown system configured to release a pressure within the fluid compressor system when the inlet on the EMTV is closed.

20 Claims, 9 Drawing Sheets

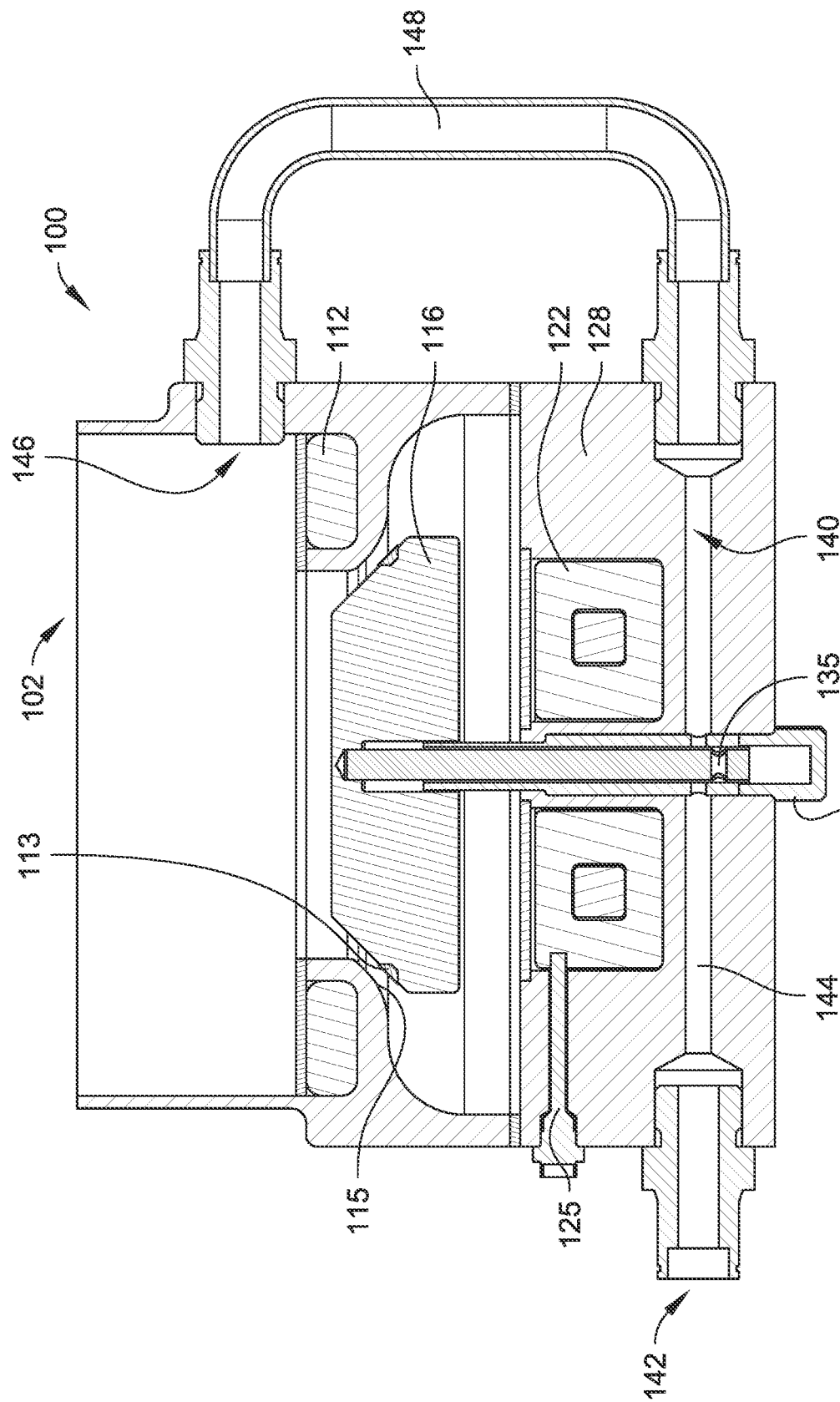

ELECTRO-MAGNETIC THROTTLE VALVE WITH INTEGRATED BLOWDOWN CONDUIT

BACKGROUND

Compressors increase the pressure of a compressible fluid (e.g., air, gas, etc.) by reducing the volume of the fluid. Often, compressors are staged so that the fluid is compressed several times in different stages to further increase the discharge pressure of the fluid. However, as the pressure of the fluid increases, the temperature of the fluid also increases. Thus, in some compressors, the compressed fluid may be cooled in between stages.

DRAWINGS

The Detailed Description is described with reference to the accompanying figures. The use of the same reference numbers in different instances in the description and the figures may indicate similar or identical items.

FIG. 4B is a side cross-sectional view of the EMTV shown in FIG. 1 along line '4', wherein a valve plate is in an intermediate or partially open position in accordance with example embodiments of the present disclosure.

DETAILED DESCRIPTION

Figure 1:
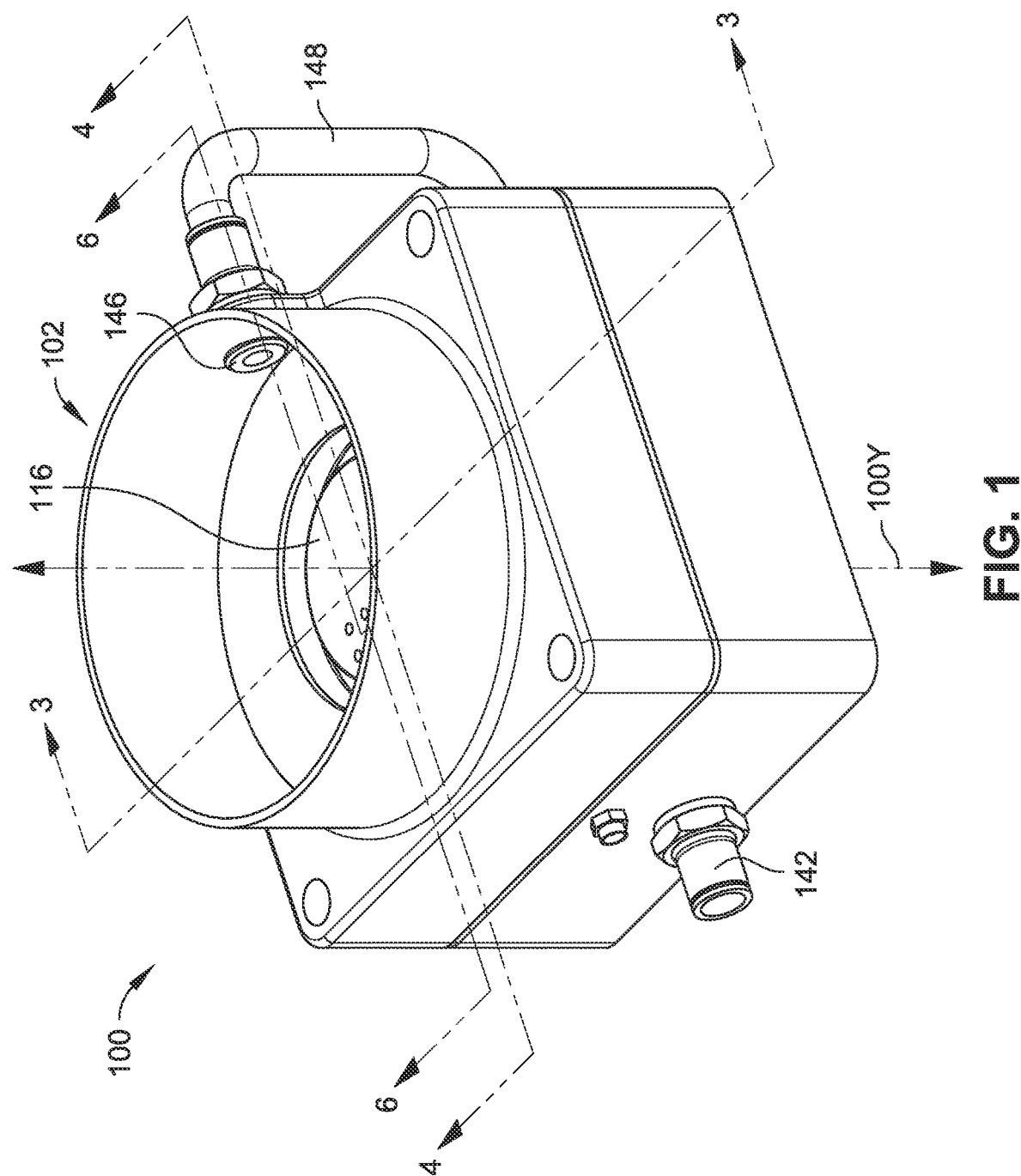
FIG. 1 is an isometric top view of an electro-magnetic throttle valve (EMTV), showing an EMTV inlet in accordance with example embodiments of the present disclosure.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

Overview

Fluid compressor systems increase the pressure of a working fluid such as air or gas, and are widely used in a variety of industries such as in construction, manufacturing, agriculture, energy production, etc. Compressor systems may be positive displacement compressors or dynamic compressors, such as, but not limited to, axial and centrifugal compressors. Positive displacement compressor systems such as, but not limited to, rotary screw compressors, confine a successive volume of the working fluid within a closed space that is mechanically reduced, compressing the working fluid and increasing the working fluid's pressure and temperature. Types of rotary screw compressors include contact-cooled rotary (CCR) compressors, also called oil-injected rotary screw compressors, and oil-free rotary (OFR) compressors.

In fluid compressor systems, capacity control is employed to regulate the volume of the compressed working fluid, where the capacity of the fluid compressor system is the quantity of working fluid that the fluid compressor system will deliver at a specific discharge pressure. In rotary screw compressors, different capacity control schemes are used, including start/stop, load/unload, modulation, variable displacement, and variable speed. Load/unload (having a load operation and an unload operation) and modulation capacity control schemes are controlled through an inlet valve operating in synchrony with a blowdown valve.

Typical throttle valves that are employed as inlet valves and/or blowdown valves use a combination of mechanical components such as pneumatic components, solenoid valves, seal elements, and electric components to drive the operation of the throttle valves. These elements may be unreliable and require frequent maintenance and/or replacement.

Accordingly, the present disclosure is directed to a fluid compressor system having an electro-magnetic throttle valve (EMTV) that utilizes magnetic force supplied by an electromagnet to actuate the opening and closing of the throttle valve. The fluid compressor system may include a control system that controls the actuation of the electromagnet and the position of a valve plate of the EMTV, allowing the EMTV to partially actuate to a plurality of partially open or intermediate positions depending on a current supplied to the electromagnet by the control system. The ability to control the partial opening and closing of the valve plate allows the EMTV to modulate the operation of the fluid compressor system.

The control system may control a location of the valve plate with reference to the electromagnet by balancing the forces acting on the valve plate, including but not limited to electromagnetic force supplied by the electromagnet, biasing forces supplied by biasing components, and gravitational forces acting on the valve plate. The EMTV may include a combination of biasing components, such as permanent magnets or compression springs, where the biasing components may be configured to oppose and/or assist the actuation of the valve plate by the electromagnet.

The EMTV may include a blowdown system having a blowdown conduit connected to a discharge of a compressor assembly of the fluid compressor system. The blowdown system is configured to release a pressure within the fluid compressor system when the inlet on the EMTV is closed.

Detailed Description of Example Embodiments

Referring generally to FIGS. 1 through 6, an electro-magnetic throttle valve (EMTV) 100 is shown. The EMTV 100 includes an inlet 102, an outlet 104, and a housing 106 including a first housing portion 110 and a second housing portion 120. The EMTV 100 may be used within a fluid compressor system 1000 as shown in FIG. 7. The fluid compressor system 1000 may include a motor (not shown)

driving a compressor assembly 200. It should be understood that the compressor assembly 200 may include a single compression stage or multiple compression stages, wherein each of the compression stages has a respective airend. The EMTV 100 may receive a working fluid (e.g., air, gas, etc.) to be compressed by the compressor assembly 200.

In the embodiment shown in FIGS. 1 through 4C, the first housing portion 110 defines a supporting shoulder 118 having a valve seat 115. The supporting shoulder 118 extends radially towards an axis 100Y and may support a permanent magnet 112 and a permanent magnet cover 114. In embodiments, the housing portion 110 may support a plurality of permanent magnets 112. The first housing portion 110 further houses a valve plate 116 configured to be moved between a closed position, a plurality of partially open or intermediate positions, and a fully open position. The valve plate 116 includes a valve plate seal 113 configured to abut with the valve seat 115 when the valve plate 116 is in the closed position. The inlet 102 receives the working fluid entering the fluid compressor system 1000 and regulates the flow of the working fluid by controlling the position of the valve plate 116 to allow or block the working fluid flow.

Figure 2:
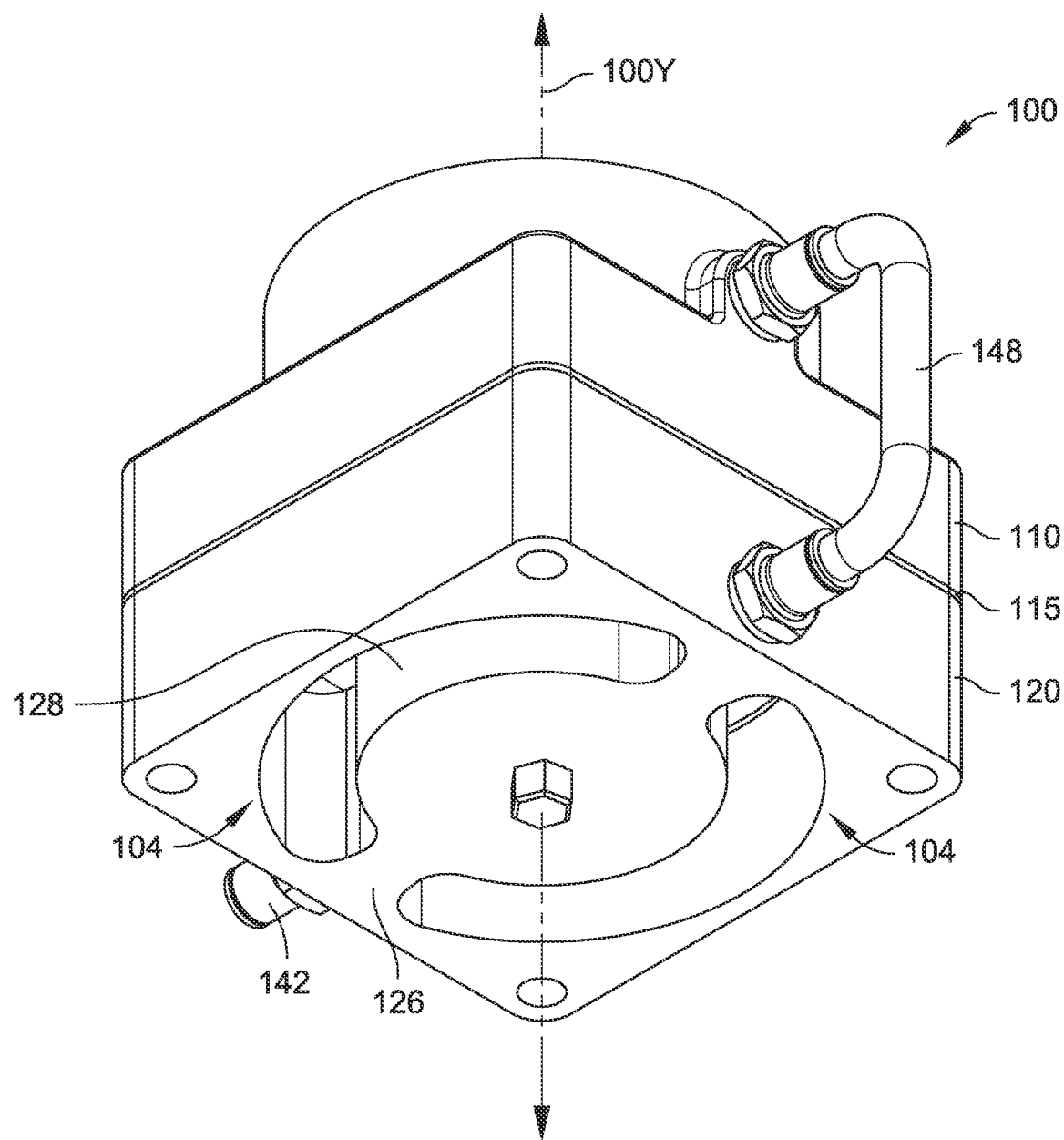
FIG. 2 is an isometric bottom view of the EMTV shown in FIG. 1, showing an EMTV outlet in accordance with example embodiments of the present disclosure.
Figure 3:
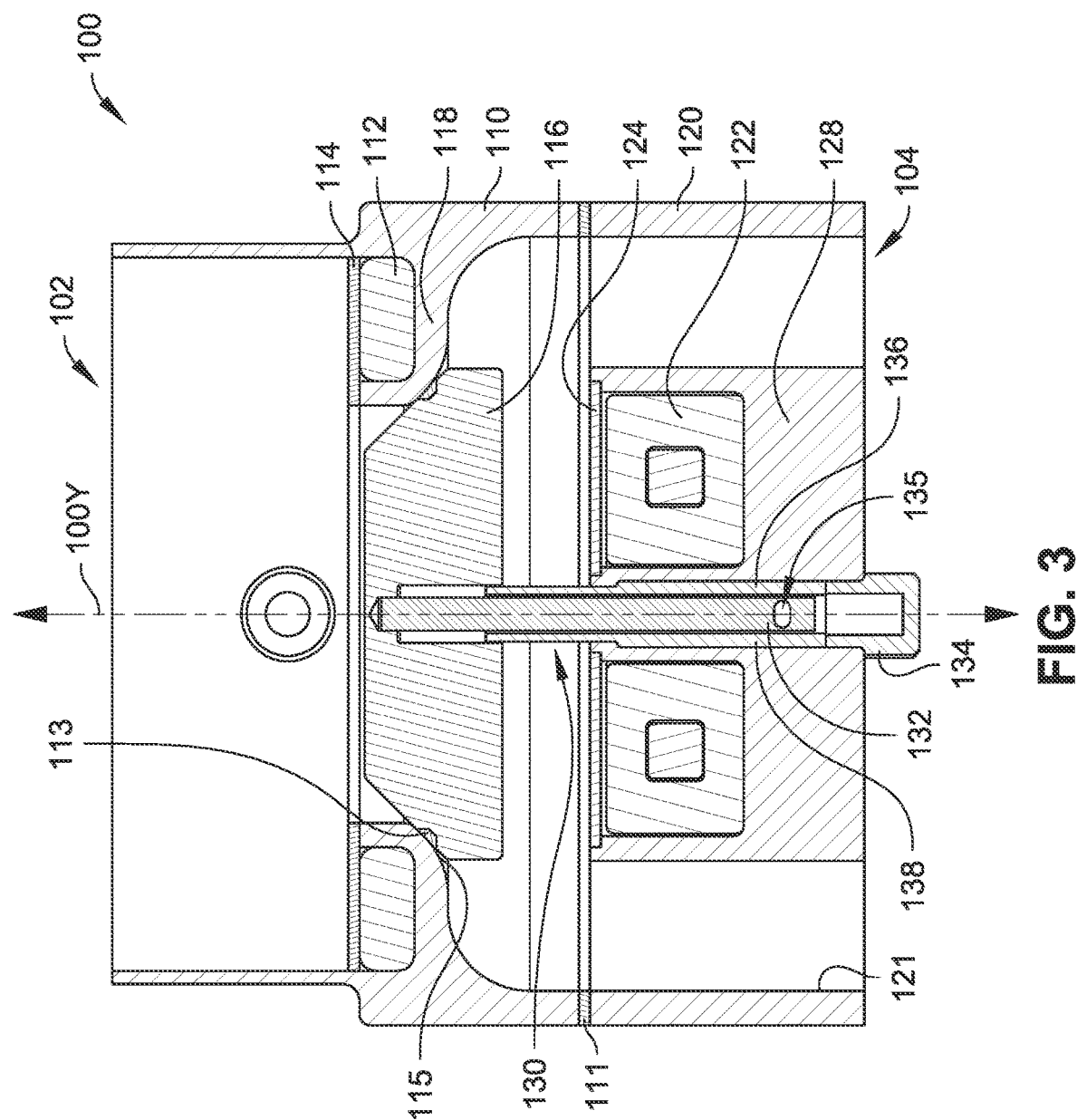
FIG. 3 is a side cross-sectional view of the EMTV shown in FIG. 1 along line '3', in accordance with example embodiments of the present disclosure.

The second housing portion 120 includes an inner surface 121 and is vertically aligned with the first housing portion 110. The EMTV 100 includes a gasket 111 located between the first housing portion 110 and the second housing portion 120. The second housing portion 120 defines a supporting frame 128 having supporting projections 126 extending from the inner surface 121 towards the vertical axis 100Y. As shown in FIG. 2, the outlet 104 at least partially surrounds the supporting frame 128 and the supporting projections 126. In the example embodiment shown, the supporting frame 128 includes two supporting projections 126. In other embodiments (not shown) the supporting frame 128 may include at least one supporting projection 126 or may include more than two supporting projections 126.

The supporting frame 128 supports an electromagnet 122 configured to actuate the valve plate 116, moving it from one of the fully open position, the plurality of intermediate positions, or the closed position, to another one of the fully open position, one of the plurality of partially open or intermediate positions, or the closed position. The supporting frame 128, supporting the electromagnet 122, is configured to allow the flow of working fluid around the electromagnet 122 when the valve plate 116 is in the fully open position or one of the intermediate positions, to cool the electromagnet 122. The supporting frame 128 may also include an electromagnet cover 124 configured to cover the electromagnet 122 and protect it from oil and/or from the working fluid entering the inlet 102.

In the embodiments illustrated, the electromagnet 122 is shown as having a circular shape and is concentrically aligned with the valve plate 116 with reference to the vertical axis 100Y. In other embodiments, a plurality of electromagnets 122 may be disposed on the supporting frame 128 instead of the single circular-shaped electromagnet. A power inlet 125 may be connected to the electromagnet 122 through the housing 106. The power inlet 125 is configured to supply electrical power (a current/voltage) to the electromagnet 122, energizing the electromagnet 122 to exert an electromagnetic force on the valve plate 116.

The actuation of the electromagnet 122 may be controlled by a valve control system (not shown). In embodiments, the valve control system positions the valve plate 116 by balancing the forces acting on the valve plate 116. The valve control system may be in communication with a plurality of sensors, including but not limited to airend temperature sensors, pressure sensors, working fluid humidity sensors, ambient temperature sensors, ambient humidity sensors, etc. connected to the fluid compression system 1000. The valve control system may receive an input with a desired flow rate and adjust the current/voltage supplied to the electromagnet 122. The forces acting on the valve plate 116 may be a combination of magnetic force exerted by the electromagnet 122, magnetic force exerted by the permanent magnet 112, gravitational forces, and/or biasing forces acting on the valve plate 116.

Figure 4A:
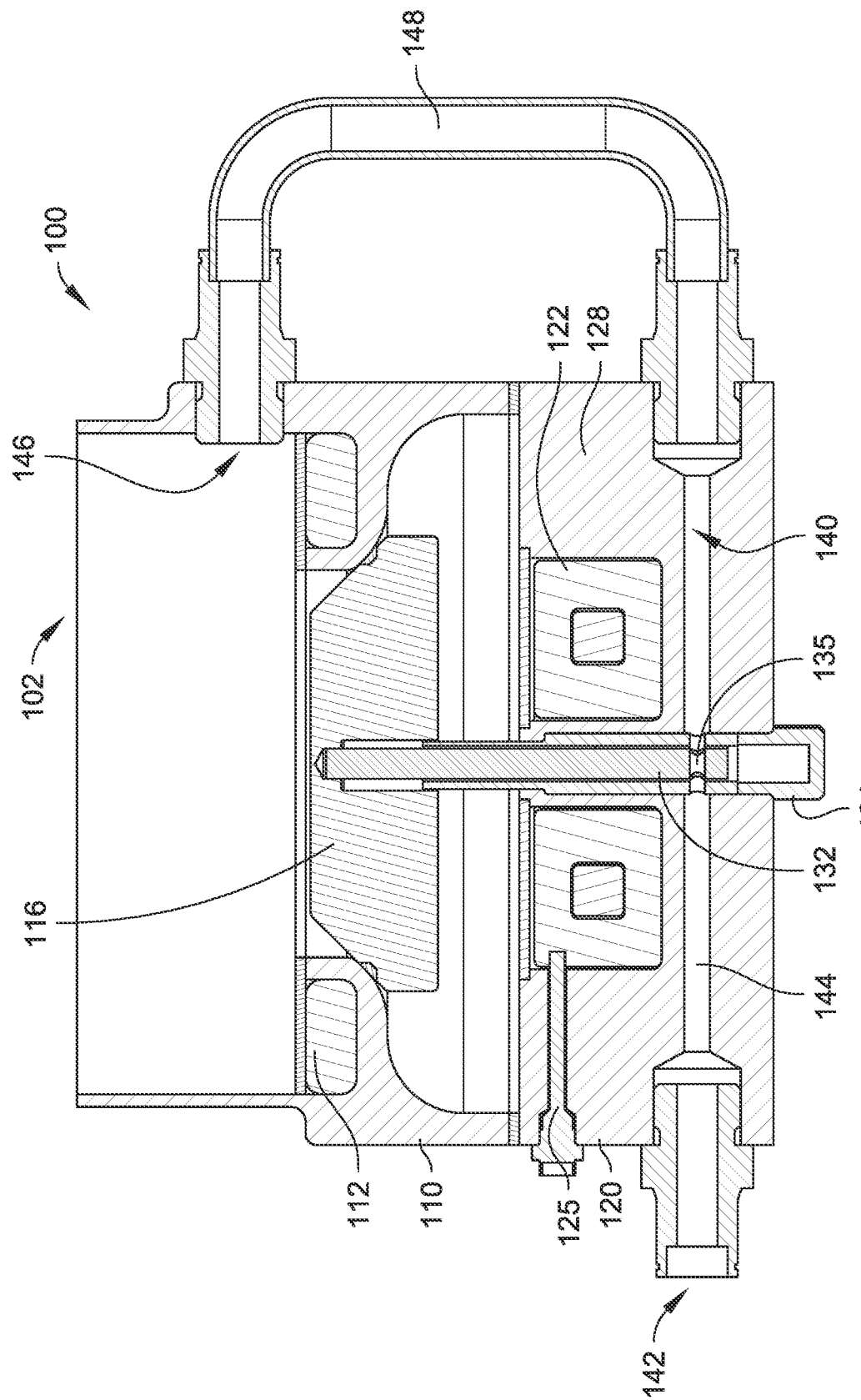
FIG. 4A is a side cross-sectional view of the EMTV shown in FIG. 1 along line '4', wherein a valve plate is in a closed position in accordance with example embodiments of the present disclosure.
Figure 4C:
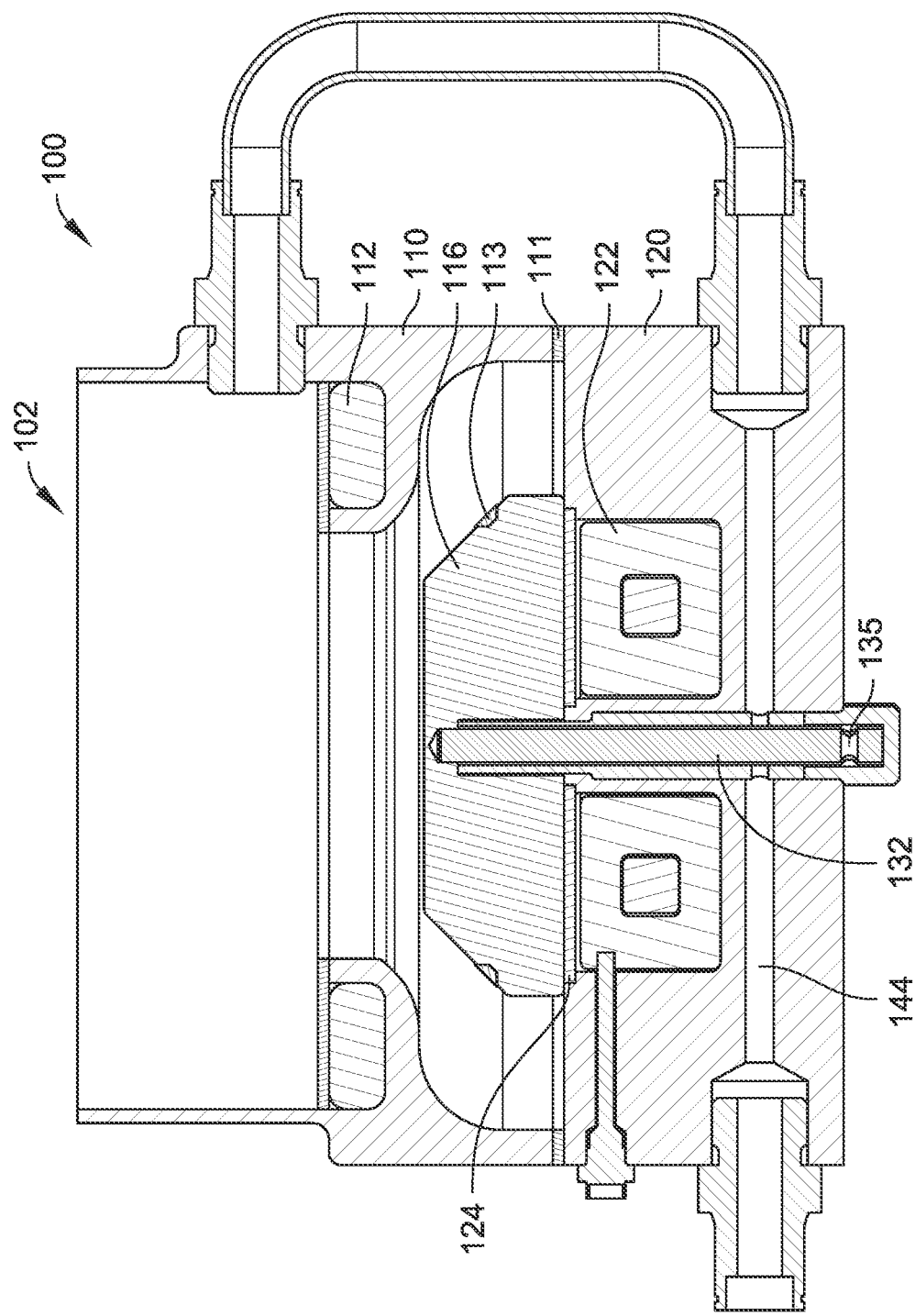
FIG. 4C is a side cross-sectional view of the EMTV shown in FIG. 1 along line '4', wherein a valve plate is in a fully open position in accordance with example embodiments of the present disclosure.

In the example embodiment shown in FIGS. 4A through 4C, the permanent magnet 112 and the electromagnet 122 are positioned in opposing directions with respect to the valve plate 116. In this embodiment, the magnetic force exerted to the valve plate 116 by the electromagnet 122 when the electromagnet 122 is energized opposes the magnetic forces exerted to the valve plate 116 by the permanent magnet 112 (i.e. they have opposite polarity (N/S)). As the permanent magnet 112 exerts a magnetic force on the valve plate 116 indefinitely (as opposed to the electromagnet 122 that requires a supplied current/voltage), the permanent magnet 112 biases the valve plate 116 to a resting (unactuated) position, for example a normally closed position, as shown in the example embodiments illustrated. In other embodiments (not shown) the polarities and/or the position of the permanent magnet 112 and the electromagnet 122 with respect to the valve plate 116 may be reversed. In such embodiments, the valve plate 116 may be biased to a rest position comprised of a fully open position.

As the electromagnet 122 is energized, the electromagnetic force exerted to the valve plate 116 may partially overcome the magnetic force exerted by the permanent magnet 112 and move the valve plate 116 away from the resting position, in this case, moving the valve plate 116 from the normally closed position towards a fully open position. During emergency stops of the fluid compression system 1000, the control system may stop supplying electrical power (current/voltage) to the electromagnet 122, allowing the valve plate 116 to move back towards the closed position at the influence of the biasing forces of the permanent magnet 112.

When the control system fully energizes the electromagnet 122, the electromagnet 122 pulls the valve plate 116 towards a fully open position. As the force generated by the electromagnet 122 is proportional to the current/voltage supplied by the control system, the force exerted to the valve plate 116 to overcome the biasing forces generated by the permanent magnet 112 and/or other biasing components is also proportional to the current/voltage supplied. This allows the control system to modulate and control the partial or full opening of the valve plate 116. By varying the current/voltage input to the electromagnet 122, in combination with the gravitational pull and the biasing force exerted by the permanent magnet 112, a net force applied to the valve plate 116 from the two opposing directions can be varied, effectively controlling the position of the valve plate.

Figure 5:
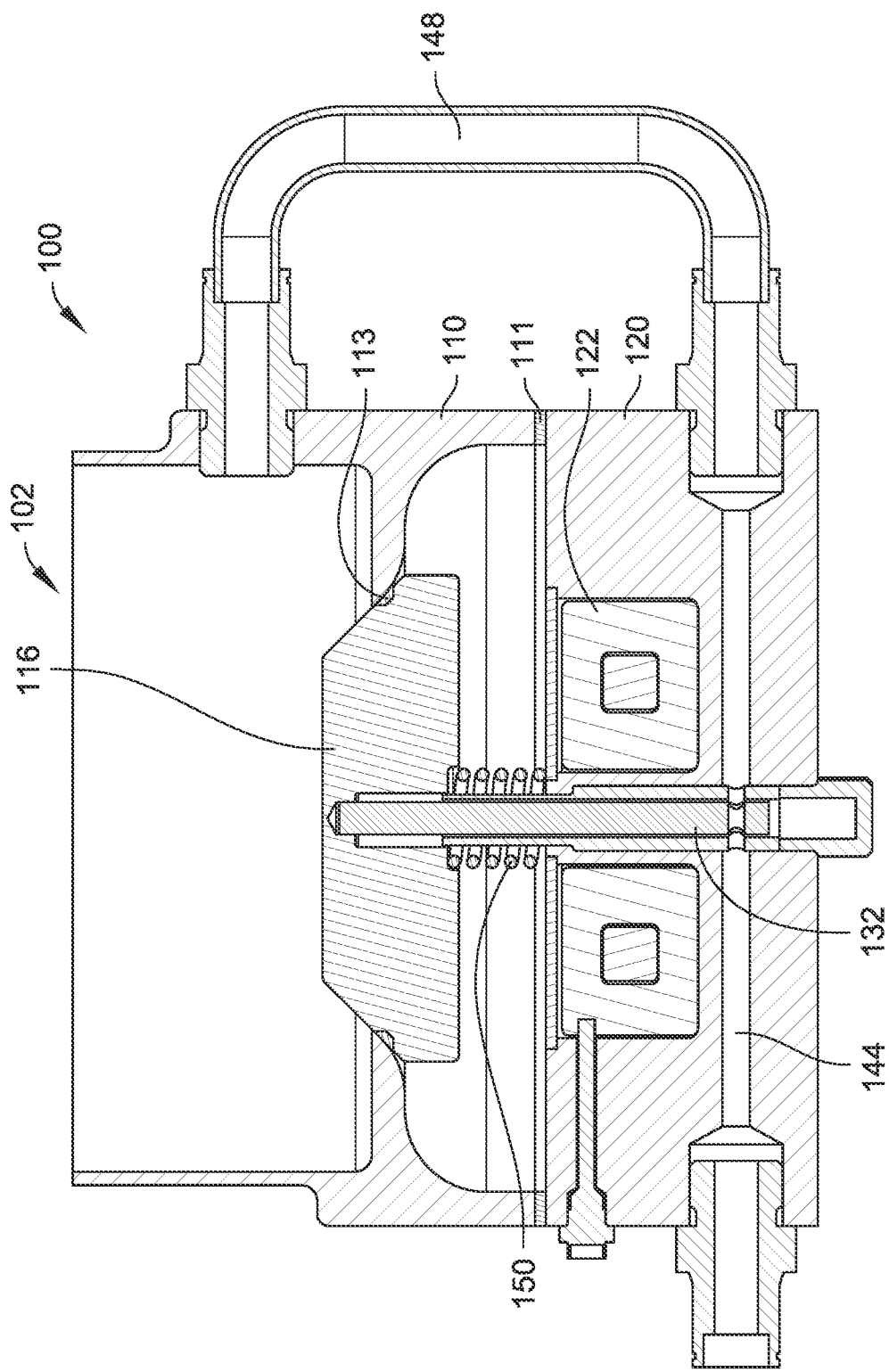
FIG. 5 is a side cross-sectional view of an EMTV having a biasing spring in accordance with example embodiments of the present disclosure.

As shown in FIG. 5, a biasing component 150 may be used to exert a biasing force instead of, or in addition to, the biasing force exerted by the permanent magnet 112 to the valve plate 116. The biasing component may be one of or a combination of springs, including but not limited to tension springs and compression springs, and permanent magnets. It should be understood that the EMTV 100 may include a plurality of biasing components configured to bias the valve plate 116 to one of the closed position or the fully open position, depending on the desired application. The permanent magnet 112 may also function as a biasing component, and may be attached to either the first housing portion 110 or the second housing portion 120. In other embodiments (not shown), the biasing component may be a combination of at least two permanent magnets, having at least one permanent magnet supported by the valve plate 116 and at least one permanent magnet supported by the housing 106.

In example embodiments (not shown), the permanent magnet is incorporated directly in or within a surface of the valve plate 116. In such embodiments, the permanent magnet may exert a force to either one of the first housing portion 110 or the second housing portion 120. In other embodiments, a combination of permanent magnets may be included in both the first housing portion 110 and the second housing portion 120. In further embodiments, the polarity of the electrical current input to the electromagnet 122 may be reversed temporarily to assist the movement of the valve plate 116 to the resting position. The electromagnet 122 (having reversed polarity) may be used either alone or in combination with the biasing components described previously.

The second housing portion includes a valve rod assembly 130 coaxial with the vertical axis 100Y. The valve rod assembly 130 to connects the valve plate 116 with the supporting frame 128 and guide the movement of the valve plate 116 between the fully open position, the plurality of intermediate positions, and the closed position. The valve rod assembly 130 includes a valve rod 132 having an orifice 135, a sleeve 136 surrounding the valve rod 132, and a rod seal 138 positioned between the valve rod 132 and the sleeve 136. The valve rod assembly 130 may also include an endcap 134 located at a bottom surface of the supporting frame 128. The endcap 134 abutts an end of the sleeve 136, closing a bore of the supporting frame 128. The bore may be coaxial with the vertical axis 100Y and the valve rod assembly 130. In other embodiments (not shown), a plurality of valve rod assemblies may be arranged around the supporting frame 128 and configured to support and guide the movement of the valve plate 116.

The EMTV 100 may include a blowdown system 140 housed in the second housing portion 120. The blowdown system 140 is configured to release a buildup of pressure within the fluid compressor system 1000 through a blowdown outlet 146 when the fluid compressor system 1000 is in the unloading operation and the valve plate 116 is closed. The blowdown system 140 may include a blowdown inlet 142, a blowdown conduit 144, a blowdown outlet 146, and blowdown piping 148. The blowdown conduit 144 conducts a blowdown fluid flow in a direction perpendicular to the vertical axis 100Y and bisects the valve rod assembly 130. The blowdown inlet 142 is in fluid communication with a discharge of the compressor assembly 200.

During the blowdown operation, the blowdown fluid flow enters the blowdown inlet 142, and flows through the blowdown conduit 144 defined in the second housing portion 120. The blowdown conduit 144 is bisected by the valve rod 132, the sleeve 136, and the rod seal 138. When the valve plate 116 is at the closed position, as shown in FIG. 4A, the valve rod orifice 135 aligns with the blowdown conduit 144 and with corresponding orifices in the sleeve 136, and the rod seal 138, allowing the blowdown fluid flow to flow to the blowdown piping 148 and exit through the blowdown outlet 146.

As shown in FIGS. 4B and 4C, when the valve plate 116 is at one of the plurality of intermediate positions or the fully open position, the valve rod assembly 130 seals the blowdown conduit 144, thereby blocking the blowdown system 140 and allowing a pressure to build up at the discharge of the compressor assembly 200.

In example embodiments, the first housing portion 110 is made from a magnetic material to allow the magnetic forces exerted by the permanent magnet 112 pass through the supporting shoulder 118 and act on the valve plate 116. For example, the magnetic material may be iron, cobalt, nickel, etc., or alloys and other combinations thereof. In other embodiments, only the supporting shoulder 118 is made from a magnetic material and the rest of the first housing portion 110 is made from a non-magnetic material. The second housing portion 120 may be made from a non-magnetic material to avoid electromagnetic leaking and direct the electromagnetic forces exerted by the electromagnet 122 in the desired direction.

The valve plate 116 may be made using a magnetic material or may have a composite design, for example, having a non-magnetic casing with magnets and/or magnetic material located at the top surface and bottom surface proximal to the permanent magnet 112 and the electromagnet 122. The permanent magnet 122 may be composed of a material resistant to deterioration due to being exposed to high-temperatures. For example, the permanent magnet may be made from neodymium, samarium cobalt, ceramic, or alloys including aluminum, nickel, and cobalt, among others.

Figure 6:
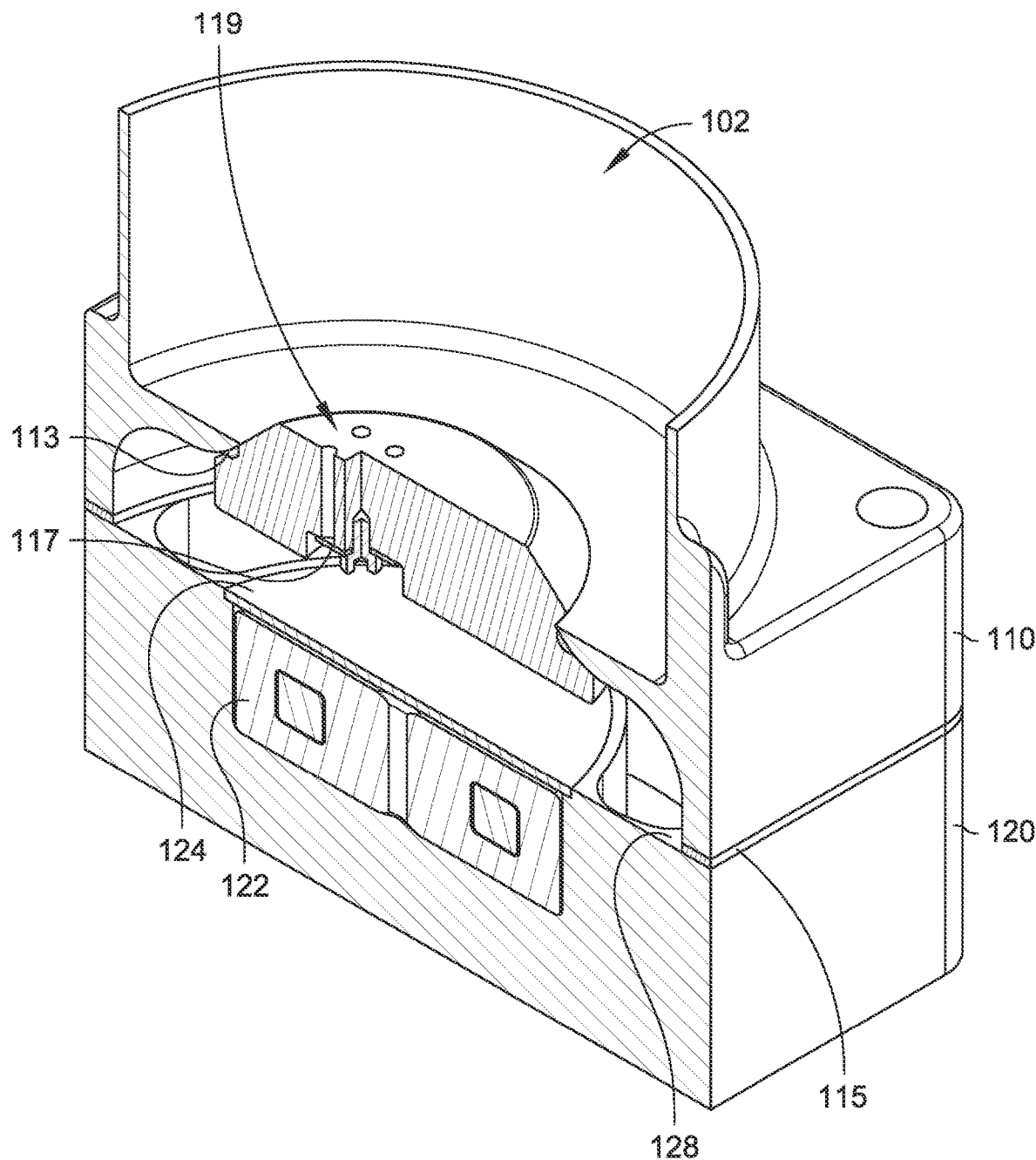
FIG. 6 is a side cross-sectional view of the EMTV shown in FIG. 1 along line '6', showing bleed holes on a valve plate in accordance with example embodiments of the present disclosure.
Figure 7:
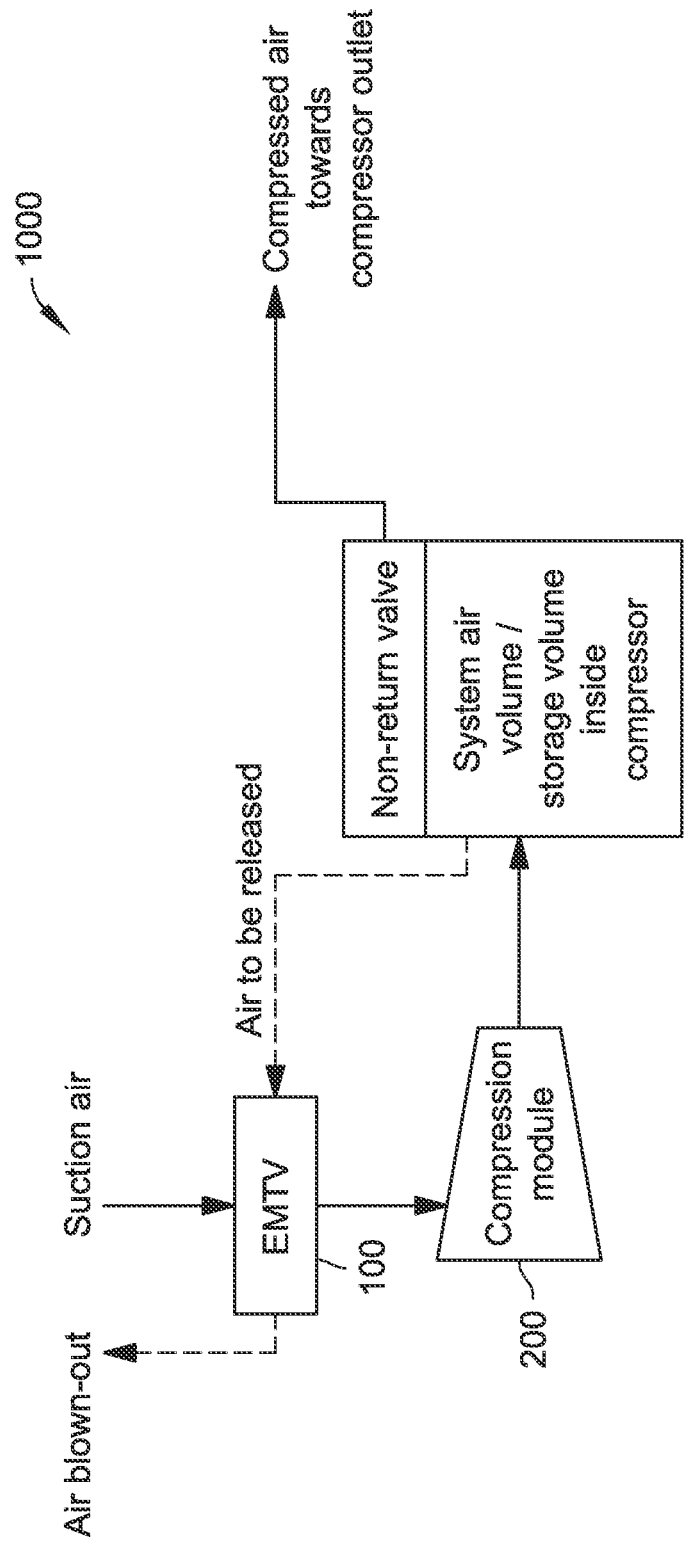
FIG. 7 is a schematic view of a compression system including an EMTV in accordance with example embodiments of the present disclosure.

Referring to FIG. 6, the valve plate 116 may include a plurality of bleed holes 119 extending from a top surface to a bottom surface of the valve plate 116. The bleed holes 119 are configured to allow a low volume of fluid flow to flow into the airend when the valve plate 116 is closed. The bleed holes 119 may be covered by a flapper 117 fixedly attached to the bottom surface of the valve plate 116 by a fastener. In example embodiments (not shown), a bleed hole may also be included in the end cap 134 to release fluid locked at a bottom portion of the valve rod 132.

In the example embodiment shown in FIGS. 4A through 4C, the valve plate seal 113 is a ring seal configured to seal an inflow of working fluid from entering into the airend when the valve plate 116 is in the closed position. In embodiments, the valve plate seal 113 may be one of an O-ring, a U-ring, a V-ring, a flat seal, a lip seal, or a guide ring, among others. The valve plate seal 113 and the rod seal 136 may be formed of Polytetrafluoroethylene (PTFE), nitrile, neoprene, ethylene propylene diene monomer (EPDM) rubber, a fluorocarbon rubber, or a combination thereof.

In embodiments, the control system may monitor the energy consumption of the electromagnet 122. Variations in the energy consumption of the electromagnet 122 may provide prognostics of the fluid compression system 1000, including but not limited to identifying upstream air filter clogging, compression assembly health, and failure prediction of the EMTV 100 (e.g., seals, the permanent magnet 112, the electromagnet 122, etc.).

The control system may further learn from operating data acquired from the EMTV 100 to perform, control, improve, and adapt the capacity control provided by the EMTV 100 to the fluid compression system 1000. Furthermore, the EMTV 100 may include a positioning sensor, such as but not limited to a Hall Effect sensor to track the position of valve plate 116 and provide feedback control of the EMTV 100. The EMTV 100 is configured to control a suction of the fluid compression system 1000 by controlling the opening and closing of the inlet 102 supplying the working fluid to the compressor assembly 200.

Furthermore, the EMTV 100 allows the fluid compressor system 1000 to operate at an unloaded state by letting blowdown of working fluid from downstream of compressor assembly. In addition, the EMTV 100 allows the fluid compressor system 1000 to control the operating capacity by varying the opening positions of the valve plate 116 at the inlet 102, acting as a throttle valve for capacity control.

In example embodiments, the fluid compressor system 1000 may be an oil-free rotary (OFR) screw compressor, a contact-cooled rotary (CCR) screw compressor, a rotary vane compressor, a reciprocating compressor, a centrifugal compressor or an axial compressor. In other example embodiments, the EMTV 100 may be incorporated or retrofitted with other equipment having a compression application, including but not limited to, heating, ventilation, and air conditioning (HVAC) systems, refrigeration systems, gas turbine systems, automotive applications, and so forth. For example, in embodiments where the fluid compressor system 1000 is a CCR screw compressor, the EMTV 100 may also operate as a check valve blocking a returning flow of air-oil mixture form the compressor assembly 200 towards a suction line.

While the subject matter has been illustrated and described in detail in the drawings and foregoing description, the same is to be considered as illustrative and not restrictive in character, it being understood that only example embodiments have been shown and described and that all changes and modifications that come within the spirit of the subject matters are desired to be protected. In reading the claims, it is intended that when words such as "a," "an," "at least one," or "one of" a plurality of are used there is no intention to limit the claim to only one item unless specifically stated to the contrary in the claim unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A fluid compressor system for compressing a working fluid comprising:
   a compressor assembly operable to receive and compress the working fluid, the compressor assembly having a discharge; and
   an electro-magnetic throttle valve (EMTV) including:
   an inlet valve for receiving the working fluid into the fluid compressor system, the inlet valve configured to regulate flow of the working fluid into the compressor assembly, the inlet valve having a ferromagnetic valve plate configured to move between a fully open position and a closed position,
   an electromagnet supported by a supporting frame, the electromagnet configured to actuate the movement of the valve plate between the fully open position and the closed position, and
   a blowdown conduit disposed within the supporting frame, the blowdown conduit coupled to the discharge of the compressor assembly, the blowdown conduit configured to at least partially release pressure within the fluid compressor system when the valve plate is at the closed position.

2. The fluid compressor system of claim 1, wherein the EMTV includes a first housing portion and a second housing portion, the first housing portion housing the valve plate of the inlet valve and the second housing portion defining an outlet of the inlet valve and the supporting frame.

3. The fluid compressor system of claim 1, wherein the EMTV includes a valve rod assembly connecting the valve plate with the supporting frame, the valve rod assembly configured to guide the movement of the valve plate and including a valve rod having an orifice, wherein when the valve plate is at the closed position, the orifice of the valve rod aligns with the blowdown conduit, releasing the pressure built from the discharge of the compressor assembly.

4. The fluid compressor system of claim 3, wherein the electromagnet is configured to actuate the movement of the valve plate to at least one of a plurality of intermediate positions, and where the valve rod assembly includes a sleeve and a rod seal surrounding the valve rod, the sleeve and the rod seal including a respective orifice aligned with the orifice of the valve rod, wherein when the valve plate is at the fully open position or at one of the plurality of intermediate positions, the valve rod, the rod seal, and the sleeve close the blowdown conduit.

5. The fluid compressor system of claim 1, wherein the EMTV includes a biasing mechanism configured to bias the movement of the valve plate to the closed position.

6. The fluid compressor system of claim 5, wherein the biasing mechanism is at least one of a permanent magnet, a compression spring, or a tension spring.

7. The fluid compressor system of claim 1, wherein the EMTV includes a biasing mechanism configured to bias the movement of the valve plate to the fully open position.

8. A fluid compressor system for compressing a working fluid comprising:
   a compressor assembly operable to receive and compress the working fluid; and
   an electro-magnetic throttle valve (EMTV) including:
   an inlet valve for receiving the working fluid into the fluid compressor system, the inlet valve configured to regulate flow of the working fluid into the compressor assembly, the inlet valve having a ferromagnetic valve plate configured to move between a fully open position and a closed position, and
   an electromagnet aligned with the valve plate, the electromagnet supported by a supporting frame,
   the supporting frame defining a blowdown conduit configured to release a pressure within the fluid compressor system,
   wherein the electromagnet actuates the movement of the valve plate between the fully open position and the closed position.

9. The fluid compressor system of claim 8, wherein the blowdown conduit is coupled to a discharge of the compressor assembly and is configured to release the pressure within the fluid compressor system when the valve plate is at the closed position.

10. The fluid compressor system of claim 8, wherein the EMTV includes a first housing portion and a second housing portion, the first housing portion housing the valve plate of the inlet valve and the second housing portion defining an outlet of the inlet valve and the supporting frame configured to hold the electromagnet.

11. The fluid compressor system of claim 8, wherein the EMTV includes a valve rod assembly connecting the valve plate with the supporting frame, the valve rod assembly configured to guide the movement of the valve plate and including a valve rod having an orifice, and wherein when the valve plate is at the closed position, the orifice of the valve rod aligns with the blowdown conduit, releasing the pressure built from the discharge of the compressor assembly.

12. The fluid compressor system of claim 11, wherein the electromagnet is configured to actuate the movement of the valve plate to at least one of a plurality of intermediate positions, and where the valve rod assembly includes a sleeve and a rod seal surrounding the valve rod, the sleeve and the rod seal including a respective orifice aligned with the orifice of the valve rod, wherein when the valve plate is at the fully open position or at one of the plurality of intermediate position, the valve rod, the rod seal, and the sleeve close the blowdown conduit.

13. The fluid compressor system of claim 8, wherein the EMTV includes a biasing mechanism configured to bias the movement of the valve plate towards the closed position.

14. The fluid compressor system of claim 13, wherein the biasing mechanism is at least one of a permanent magnet, a tension spring, or a compression spring.

15. An electro-magnetic throttle valve (EMTV) configured to regulate a flow of a working fluid in a fluid compressor system, the EMTV comprising:
  an inlet valve for receiving the working fluid into a compressor assembly of the fluid compressor system, the compressor assembly having a discharge and the inlet valve having a ferromagnetic valve plate configured to move between a fully open position and a closed position,
  an electromagnet supported by a supporting frame, the electromagnet configured to actuate the movement of the valve plate between the fully open position and the closed position, and
  a blowdown conduit disposed within the supporting frame, the blowdown conduit coupled to the discharge and configured to at least partially release pressure within the fluid compressor system when the valve plate is at the closed position.

16. The EMTV of claim 15, wherein the EMTV includes a valve rod assembly connecting the valve plate with the supporting frame, the valve rod assembly configured to guide the movement of the valve plate and including a valve rod having an orifice, wherein when the valve plate is at the closed position, the orifice of the valve rod aligns with the blowdown conduit, releasing the pressure built from the discharge of the compressor assembly.

17. The EMTV of claim 16, wherein the electromagnet is configured to actuate the movement of the valve plate to at least one of a plurality intermediate position, and where the valve rod assembly includes a sleeve and a rod seal surrounding the valve rod, the sleeve and the rod seal including a respective orifice aligned with the orifice of the valve rod, wherein when the valve plate is at the fully open position or at the intermediate position, the valve rod, the rod seal, and the sleeve close the blowdown conduit.

18. The EMTV of claim 15, further including a biasing mechanism configured to bias the movement of the valve plate to the closed position.

19. The EMTV of claim 18, wherein the biasing mechanism is at least one of a permanent magnet, a compression spring, or a tension spring.

20. The EMTV of claim 15, further including a biasing mechanism configured to bias the movement of the valve plate to the fully open position.

* * * * *